United States Patent
Motegi et al.

(10) Patent No.: US 12,260,587 B2
(45) Date of Patent: Mar. 25, 2025

(54) VEHICLE POSITION INFORMATION ACQUISITION DEVICE, VEHICLE POSITION INFORMATION ACQUISITION SYSTEM, AND VEHICLE POSITION INFORMATION ACQUISITION METHOD

(71) Applicant: SUBARU CORPORATION, Tokyo (JP)

(72) Inventors: Keisuke Motegi, Tokyo (JP); Shingo Ugajin, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 311 days.

(21) Appl. No.: 18/048,575

(22) Filed: Oct. 21, 2022

(65) Prior Publication Data

US 2023/0154043 A1  May 18, 2023

(30) Foreign Application Priority Data

Nov. 16, 2021  (JP) .................................. 2021-186097

(51) Int. Cl.
  *G06T 7/73*   (2017.01)
  *G06V 20/56*  (2022.01)
  *G06V 20/58*  (2022.01)

(52) U.S. Cl.
  CPC .............. *G06T 7/74* (2017.01); *G06V 20/584* (2022.01); *G06V 20/588* (2022.01); *G06T 2207/30256* (2013.01)

(58) Field of Classification Search
  CPC ... G06T 7/74; G06T 2207/30256; G06T 7/85; G06T 5/50; G06T 5/70; G06T 7/80;
  (Continued)

(56) References Cited

U.S. PATENT DOCUMENTS 4,937,752 A * 6/1990 Nanba ..................... G01C 21/28
                                                            701/445
2017/0350712 A1* 12/2017 Tateishi ............. G01C 21/3602
(Continued)

FOREIGN PATENT DOCUMENTS

JP     2001-331787 A    11/2001
JP     2011-191239 A     9/2011

*Primary Examiner* — Nimesh Patel
(74) *Attorney, Agent, or Firm* — Rimon P.C.

(57) ABSTRACT

A vehicle position information acquisition device includes: a position information detector that detects position information of a vehicle; a map data storage that stores a feature type of a feature on a map and a position data group in association with each other; an imaging unit that images a region ahead of the vehicle; a feature detector that detects a surrounding feature; a reference position data group extractor that extracts a reference position data group; a reference position data group storage; a comparative position data group extractor that extracts a comparative position data group; a comparative position data group storage; an error processor that associates reference position data with comparative position data having a shortest distance and calculates an error in a distance between the reference position data and the comparative position data that are associated with each other; and a correction unit that corrects the position information.

9 Claims, 8 Drawing Sheets

(58) Field of Classification Search
CPC .......... G06T 15/10; G06T 2207/10004; G06T 2207/10012; G06T 2207/20081; G06T 2207/20221; G06T 2207/30252; G06T 5/77; G06T 5/80; G06T 7/70; G06T 7/73; G06T 15/00; G06T 17/00; G06T 19/003; G06T 2207/10024; G06T 2207/20084; G06T 2207/30168; G06T 2207/30261; G06T 2210/04; G06T 7/00; G06T 7/246; G06T 7/33; G06T 7/38; G06T 7/55; G06T 7/593; G06T 7/66; G06T 2207/10028; G06T 7/11; G06T 2207/10016; G06T 7/0004; G06T 7/20; G06T 2207/30196; G06T 2207/30244; G06T 7/50; G06T 7/579; G06T 1/00; G06T 11/00; G06T 17/05; G06T 2200/04; G06T 19/006; G06T 2207/10036; G06T 2207/20021; G06T 2207/20116; G06T 2210/21; G06T 3/14; G06T 7/0002; G06T 7/0008; G06T 7/001; G06T 7/149; G06T 7/174; G06T 7/251; G06T 7/30; G06T 7/75; G06T 7/35; G06T 2207/30204; G06T 2207/30208; G06T 2207/10021; G06T 3/40; G06T 7/521; G06T 2207/20101; G06T 13/40; G06T 11/60; G06T 2207/10044; G06T 2207/20032; G06T 3/20; G06T 3/60; G06T 5/73; G06T 7/97; G06T 15/503; G06T 1/0064; G06T 2201/0051; G06T 2207/30236; G06T 3/4038; G06T 5/00; G06T 7/277; G06V 20/584; G06V 20/588; G06V 20/58; G06V 10/765; G06V 10/96; G06V 40/193; G06V 10/255; G06V 10/26; G06V 10/44; G06V 10/454; G06V 10/46; G06V 10/764; G06V 10/774; G06V 10/80; G06V 10/82; G06V 10/94; G06V 20/20; G06V 20/54; G06V 20/56; G06V 20/582; G06V 20/64; G06V 30/413; G06V 40/113; G06V 40/161; G06V 40/175; G06V 40/176; G06V 40/19; G06V 40/28; G06V 20/52; G06V 10/20; G06V 20/40; G06V 10/56; G06V 20/10; G06V 20/41; G06V 40/13; G06V 10/507; G06V 10/7515; G06V 20/63; G06V 20/70; G06V 40/172; G06V 10/25; G06V 10/267; G06V 10/34; G06V 10/40; G06V 10/778; G06V 40/168; G06V 40/171; G06V 40/10; G06V 40/16; G06V 10/462; G06V 20/80; G06V 30/142; G06V 10/70; G06V 20/17; G06V 40/30; G01C 21/20; G01C 21/005; G01C 21/30; G01C 21/28; G01C 11/00; G01C 11/02; G01C 11/36; G01C 21/26; G01C 21/32; G01C 21/34; G01C 21/3415; G01C 21/3635; G01C 21/3638; G01C 21/367; G01C 21/3815; G06F 18/24765; G06F 2218/08; G06F 16/29; G06F 40/20; G06F 30/13; G06F 3/04886; G06F 3/04842; H04W 4/029; H04W 4/021; H04W 64/00; H04W 4/02; H04W 88/02; H04W 4/024; H04W 4/027; H04W 4/30; H04W 4/44; H04W 4/38; H04W 4/40; H04W 4/90; H04W 4/023; G01B 11/14; G01B 11/2755; G01B 2210/143; G01B 2210/30; G01B 2210/303; G01B 11/002; G01B 11/005; G01B 11/25; G05D 1/0246; G05D 1/0088; G05D 1/0221; G05D 1/0231; G05D 1/0251; G05D 1/0253; G05D 1/0287; B25J 11/008; B25J 13/086; B25J 5/007; B25J 13/088; B25J 9/16; B25J 13/00; B25J 13/003; B25J 9/1676; G08G 1/20; G08G 1/096811; G08G 1/09; G08G 1/096844; G08G 1/096872; G08G 1/096883; G08G 1/167; G08G 1/0112; G08G 1/0129; G08G 1/0141; G08G 1/0145; G08G 1/0962; G08G 1/096816; G08G 1/0969; G08G 1/096827; G08G 1/0104; G08G 1/0133; G08G 1/017; G08G 1/04; G08G 1/16; G08G 1/163; B60R 2300/107; B60R 21/01; B60R 21/01538; B60R 25/1012; B60R 1/22; B60R 1/31; B60R 1/00; B60R 1/002; B60R 1/26; B60R 11/04; B60R 2011/004; B60R 2300/10; B60R 2300/105; B60R 2300/30; B60R 2300/8066; G06N 20/00; G06N 3/004; G06N 3/008; G06N 3/04; G06N 3/044; G06N 3/045; G06N 3/08; G06N 5/022; G06N 3/0495; G06N 3/09; G06N 3/096; G06N 20/20; G06N 3/0464; G06N 3/0475; G06N 3/082; G06N 7/01; B60W 2556/50; B60W 30/12; B60W 2420/403; B60W 2554/80; B60W 2552/05; B60W 2552/15; B60W 2552/20; B60W 2552/30; B60W 2552/53; B60W 2554/802; B60W 2554/804; B60W 2555/60; B60W 30/10; B60W 2754/30; B60W 30/16; B60W 30/18172; B60W 40/06; B60W 40/072; B60W 40/076; G01S 17/894; G01S 17/86; G01S 17/931; G01S 19/51; G01S 7/52004; G01S 19/07; G01S 7/4802; G01S 13/931; G01S 13/867; G01S 13/89; G01S 13/723; G01S 17/89; G01S 19/40; G01S 19/41; G01S 5/0284; G01S 7/497; G01S 7/417

See application file for complete search history.

(56) References Cited

U.S. PATENT DOCUMENTS

| | | | |
|---|---|---|---|
| 2020/0116499 A1* | 4/2020 | Jung | G06V 20/588 |
| 2020/0252550 A1* | 8/2020 | Kim | G06V 10/454 |
| 2021/0001902 A1* | 1/2021 | Tsutsumi | G01S 17/931 |
| 2021/0183099 A1* | 6/2021 | Fujii | G06T 7/248 |
| 2022/0324468 A1* | 10/2022 | Ishikawa | B60W 40/06 |

* cited by examiner

| FEATURE TYPE | COORDINATE VALUE | |
|---|---|---|
| | X COORDINATE | Z COORDINATE |
| LANE LINE | MAx | MAz |
| LANE LINE | MBx | MBz |
| LANE LINE | MCx | MCz |
| ... | ... | ... |
| STOP LINE | MDx | MDz |
| STOP LINE | MEx | MEz |
| STOP LINE | MFx | MFz |
| ... | ... | ... |
| TRAFFIC LIGHT | MGx | MGz |
| TRAFFIC LIGHT | MHx | MHz |
| TRAFFIC LIGHT | MIx | MIz |
| ... | ... | ... |
| CROSSWALK | MJx | MJz |
| CROSSWALK | MKx | MKz |
| CROSSWALK | MLx | MLz |
| ... | ... | ... |
| SIGN | MMx | MMz |
| SIGN | MNx | MNz |
| SIGN | MOx | MOz |
| ... | ... | ... |

FIG. 2

| FEATURE TYPE | COORDINATE VALUE | |
|---|---|---|
| | X COORDINATE | Z COORDINATE |
| LANE LINE | IAx | IAz |
| LANE LINE | IBx | IBz |
| LANE LINE | ICx | ICz |
| ... | ... | ... |
| STOP LINE | IDx | IDz |
| STOP LINE | IEx | IEz |
| STOP LINE | IFx | IFz |
| ... | ... | ... |
| TRAFFIC LIGHT | IGx | IGz |
| TRAFFIC LIGHT | IHx | IHz |
| TRAFFIC LIGHT | IIx | IIz |
| ... | ... | ... |
| CROSSWALK | IJx | IJz |
| CROSSWALK | IKx | IKz |
| CROSSWALK | ILx | ILz |
| ... | ... | ... |
| SIGN | IMx | IMz |
| SIGN | INx | INz |
| SIGN | IOx | IOz |
| ... | ... | ... |

FIG. 3

VEHICLE POSITION INFORMATION ACQUISITION DEVICE, VEHICLE POSITION INFORMATION ACQUISITION SYSTEM, AND VEHICLE POSITION INFORMATION ACQUISITION METHOD

CROSS-REFERENCE TO RELATED APPLICATIONS

The present application claims priority from Japanese Patent Application No. 2021-186097 filed on Nov. 16, 2021, the entire contents of which are hereby incorporated by reference.

BACKGROUND

The disclosure relates to a vehicle position information acquisition device, a vehicle position information acquisition system, and a vehicle position information acquisition method.

In recent years, techniques related to automatic driving have been remarkably developed.

The development of the techniques related to automatic driving entails the development of a steering assistance process, an acceleration/deceleration adjustment process, or other processes that use high-precision maps.

These high-precision maps are also used to estimate own vehicle positions. High-precision maps under consideration include a high-precision map that uses a global navigation satellite system (GNSS) and a high-precision map that uses an inertial measurement unit (IMU) combined with a global positioning system (GPS).

The high-precision maps that each use GNSS or IMU combined with GPS are, however, influenced by the reception condition of the GNSS or the GPS. An example issue is that the precision of detecting position information of a vehicle is typically decreased in an area having an unfavorable reception environment such as an area in a tunnel or an urban area crowded with high-rise buildings.

To address such an issue, for example, the following techniques are disclosed that each compensate for the mismatch between actual position information of a vehicle or a feature and position information of the vehicle or the feature which is obtained from GNSS or IMU combined with GPS. In other words, for example, Japanese Unexamined Patent Application Publication (JP-A) No. 2011-191239 discloses a technique that corrects an own vehicle position on the basis of errors $\theta$, $qx$, and $qy$. The own vehicle position is detected by GPS. The errors $\theta$, $qx$, and $qy$ are calculated on the basis of a coordinate conversion equation by using respective pairs of nodes s of a surrounding object and nodes m of the surrounding object that are associated with each other. The nodes s are based on detection data provided from a laser radar. The nodes m are present in map data.

In addition, for example, JP-A No. 2001-331787 discloses a technique that estimates the three-dimensional shape of a road by using image road information and map road information to eliminate an image projection error and allow for a more precise road shape estimation than a road shape estimation made by using the image road information or the map road information alone. The image road information is obtained by extracting the shape of a road by using, for example, a method in which an image of the region ahead of a vehicle is converted into a monochromatic image, a luminance change is acquired by using a differential filter, and a portion of the monochromatic image having a great luminance change is extracted as a lane line. The map road information is obtained by extracting the coordinate points of the edges of a road on which a vehicle travels from acquired map information as the shape of the road.

SUMMARY

An aspect of the disclosure provides a vehicle position information acquisition device. The vehicle position information acquisition device includes a position information detector, a map data storage, an imaging unit, a feature detector, a reference position data group extractor, a reference position data group storage, a comparative position data group extractor, a comparative position data group storage, an error processor, and a correction unit. The position information detector is configured to detect position information of a vehicle. The map data storage is configured to store a feature type of a feature on a map and a position data group regarding a shape of the feature in association with each other. The imaging unit is configured to capture an image of a region ahead of the vehicle. The feature detector is configured to detect, on the basis of data on the image captured by the imaging unit, a surrounding feature frequently appearing within a predetermined range from the vehicle. The reference position data group extractor is configured to extract, as a reference position data group, a position data group regarding a shape of the surrounding feature having a feature type that is same as the feature type of the feature detected on the basis of the data on the image. The reference position data group storage is configured to store the reference position data group extracted by the reference position data group extractor. The comparative position data group extractor is configured to extract a comparative position data group from the position data group regarding the shape of the feature having the feature type that is same as the feature type of the surrounding feature detected by the feature detector. The comparative position data group storage is configured to store the comparative position data group extracted by the comparative position data group extractor. The error processor is configured to associate each of pieces of reference position data in the reference position data group stored in the reference position data group storage with a corresponding one of pieces of comparative position data in the comparative position data group stored in the comparative position data group storage and calculate an error in a distance between each of the pieces of the reference position data and the corresponding one of the pieces of comparative position data that are associated with each other. The corresponding one of the pieces of the comparative position data has a shortest distance to the piece of the reference position data. The correction unit is configured to correct, on the basis of the error in the distance calculated by the error processor, the position information of the vehicle detected by the position information detector.

An aspect of the disclosure provides a vehicle position information acquisition system. The vehicle position information acquisition system includes a vehicle position information detection device and a vehicle position information correction device. The vehicle position information detection device includes a position information detector, a map data storage, and a transmitter. The position information detector is configured to detect position information of a vehicle. The map data storage is configured to store a feature type of a feature on a map and a position data group regarding a shape of the feature in association with each other. The transmitter is configured to transmit the feature type, the position data group regarding the shape of the feature, and the position information of the vehicle to the vehicle position information correction device. The feature type and the position data group are stored in the map data storage. The vehicle position information correction device includes one or more processors and one or more memories communicably coupled to the one or more processors. The one or more processors are each configured to detect, on the basis of data on an image of a region ahead of the vehicle, a surrounding feature frequently appearing within a predetermined range from the vehicle, store, in a first memory, as a reference position data group, the position data group regarding the shape of the feature having the feature type that is same as the feature type of the surrounding feature detected on the basis of the data on the image, extract, from the map data storage, as a comparative position data group, the position data group regarding the shape of the feature having the feature type that is same as the feature type of the detected surrounding feature, store the extracted comparative position data group in a second memory, associate each of pieces of reference position data in the reference position data group with a corresponding one of pieces of comparative position data having a shortest distance to the piece of the reference position data in the comparative position data group, calculate an error in a distance between each of the pieces of the reference position data stored in the first memory and the corresponding one of the pieces of the comparative position data stored in the second memory that are associated with each other, and correct the received position information of the vehicle on the basis of the calculated error in the distance.

An aspect of the disclosure provides a vehicle position information acquisition method. The vehicle position information acquisition method includes detecting, on the basis of data on an image of a region ahead of the vehicle, a surrounding feature frequently appearing within a predetermined range from the vehicle, extracting, from the data on the image, as a reference position data group, a position data group regarding a shape of the feature having a feature type that is same as the feature type of the detected feature and storing the extracted reference position data group in a first memory, extracting, from a map data storage configured to store the feature type of the feature on a map and the position data group regarding the shape of the feature in association with each other, a comparative position data group regarding the shape of the feature having the feature type that is same as the feature type of the detected surrounding feature and storing the extracted comparative position data group in the second memory, associating each of pieces of reference position data in the reference position data group with a corresponding one of pieces of comparative position data in the comparative position data group and calculating an error in a distance between each of the pieces of the reference position data stored in the first memory and the corresponding one of the pieces of the comparative position data stored in the second memory, and correcting the position information of the vehicle on the basis of the calculated error in the distance. The corresponding one of the pieces of the comparative position data has a shortest distance to the reference position data.

An aspect of the disclosure provides a vehicle position information acquisition device. The vehicle position information acquisition device includes a position information detector, a map data storage, an imaging unit, a reference position data group storage, a comparative position data group storage, and circuitry. The position information detector is configured to detect position information of a vehicle. The map data storage is configured to store a feature type of a feature on a map and a position data group regarding a shape of the feature in association with each other. The imaging unit is configured to capture an image of a region ahead of the vehicle. The circuitry is configured to detect, on the basis of data on the image captured by the imaging unit, a surrounding feature frequently appearing within a predetermined range from the vehicle, extract, as a reference position data group to be stored in the reference position data group storage, a position data group regarding a shape of the surrounding feature having a feature type that is same as the feature type of the feature detected on the basis of the data on the image, extract a comparative position data group to be stored in the comparative position data group storage from the position data group regarding the shape of the feature having the feature type that is same as the feature type of the surrounding feature detected by the feature detector, associate each of pieces of reference position data in the reference position data group stored in the reference position data group storage with a corresponding one of pieces of comparative position data having a shortest distance to the piece of the reference position data in the comparative position data group stored in the comparative position data group storage, calculate an error in a distance between each of the pieces of the reference position data and the corresponding one of the pieces of the comparative position data that are associated with each other, and correct, on the basis of the calculated error in the distance, the position information of the vehicle detected by the position information detector.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a diagram illustrating an example of a data set obtained from map information in the vehicle position information acquisition device according to one example embodiment of the disclosure.

FIG. 3 is a diagram illustrating an example of a data set obtained from image information in the vehicle position information acquisition device according to one example embodiment of the disclosure.

DETAILED DESCRIPTION

Figure 1:
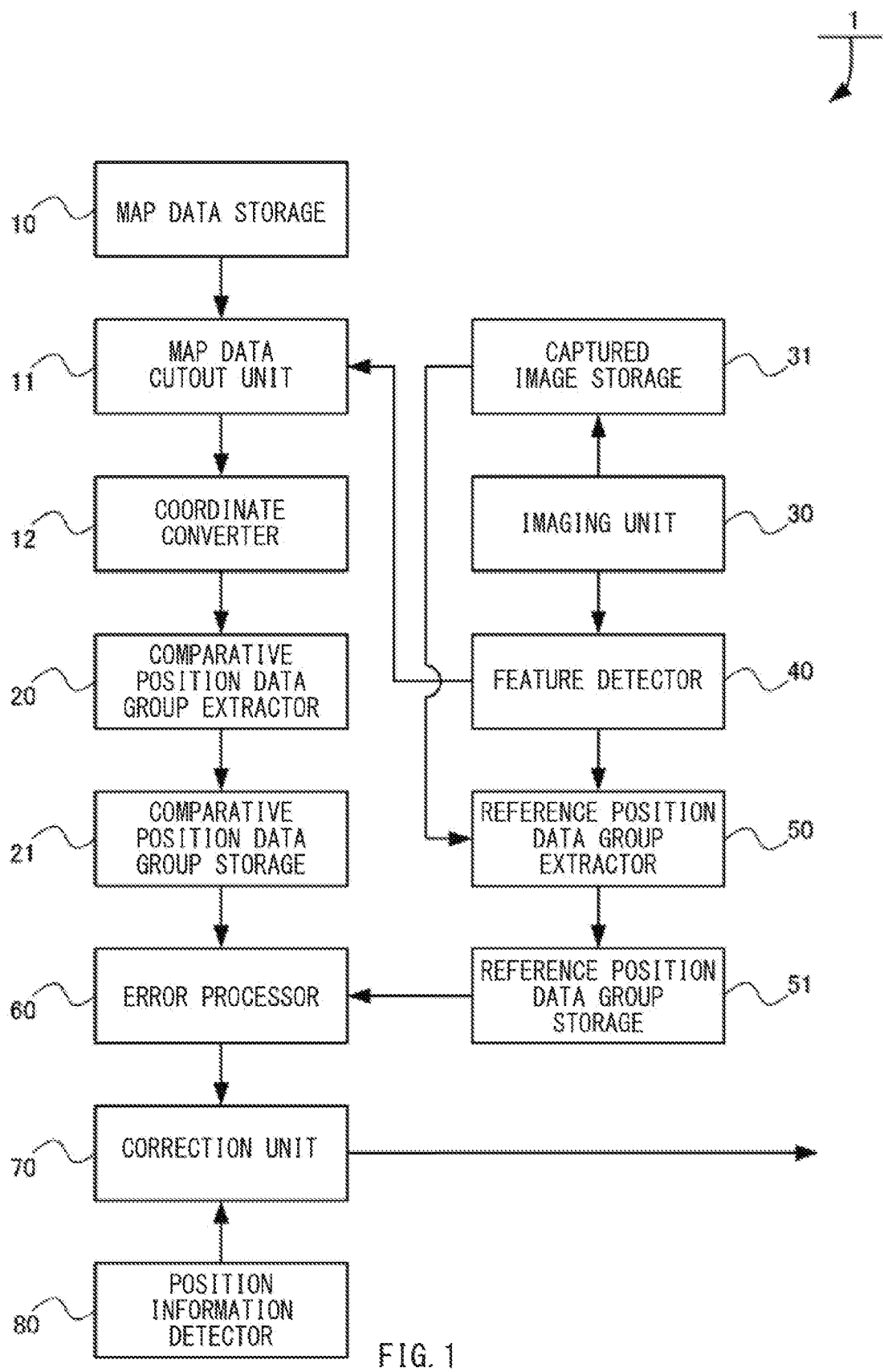
FIG. 1 is a diagram illustrating a configuration of a vehicle position information acquisition device according to one example embodiment of the disclosure.

The technique disclosed in JP-A No. 2011-191239 obtains correction values for correcting an own vehicle position for all the pieces of data in both map information and information detected by a laser radar. This raises an issue that a heavy processing load is imposed by correcting the own vehicle position in an extremely short time.

Meanwhile, on the assumption that the technique disclosed in JP-A No. 2001-331787 is used for the correction process on the own vehicle position, a road is the feature type that is used for the correction process. This raises an issue that it is difficult to execute a precise correction process, for example, for a road including neither a center line, lane lines on the road shoulders, nor other lines or a road including a lane line that, however, partially disappears.

It is desirable to provide a vehicle position information acquisition device, a vehicle position information acquisition system, and a vehicle position information acquisition method each of which makes it possible to quickly and precisely acquire position information of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A vehicle position information acquisition device 1 according to an example embodiment is described with reference to FIGS. 1 to 8.

[Configuration of Vehicle Position Information Acquisition Device 1]

As illustrated in FIG. 1, the vehicle position information acquisition device 1 according to the example embodiment may include a map data storage 10, a map data cutout unit 11, a coordinate converter 12, a comparative position data group extractor 20, a comparative position data group storage 21, an imaging unit 30, a captured image storage 31, a feature detector 40, a reference position data group extractor 50, a reference position data group storage 51, an error processor 60, a correction unit 70, and a position information detector 80.

The map data storage 10 stores the feature type of a feature on a high-precision map and a position data group regarding the shape of the feature in association with each other. The position data group may also be referred to as point group information.

For example, the map data storage 10 may use a lane line WL, a stop line SL, a traffic light TL, a crosswalk CW, a sign SN, and other features as feature types and store the feature types and the coordinate values of these features on the high-precision map in association with each other.

The map data cutout unit 11 may cut out map information regarding a region around a specific feature from the map data stored in the map data storage 10 on the basis of a result of detection by the feature detector 40 described below. The specific feature may be detected by the feature detector 40.

For example, in a case where the feature detector 40 described below detects the lane line WL, the map data cutout unit 11 may use the region surrounded by the dotted line in the example illustrated in FIG. 4 as a map data cutout region to cut out map information regarding a portion of the lane line WL and a portion of the stop line SL.

The coordinate converter 12 may convert the coordinates of a position data group expressed in the coordinate system of the map in the map information cut out by the map data cutout unit 11 into coordinates in a coordinate system in which the lateral direction of the vehicle as viewed from the front serves as an X axis and the longitudinal direction of the vehicle as viewed from the front serves as a Z axis.

For example, in a case where coordinate information that has not yet been converted is represented by Expression 1 and coordinate information that has been converted is represented by Expression 2, the coordinates may be converted in accordance with the conversion equation represented by Expression 3.

For example, FIG. 2 illustrates a database in which the position data subjected to the coordinate conversion and the feature types are associated with each other.

$$\begin{pmatrix} \text{map}_{x\_raw} \\ \text{map}_{z\_raw} \end{pmatrix} \qquad \text{Expression 1}$$

$$\begin{pmatrix} \text{map}_{x\_own} \\ \text{map}_{z\_own} \end{pmatrix} \qquad \text{Expression 2}$$

$$\begin{pmatrix} \text{map}_{x\_own} \\ \text{map}_{z\_own} \end{pmatrix} = \begin{pmatrix} \cos\theta & \sin\theta \\ -\sin\theta & \cos\theta \end{pmatrix} * \begin{pmatrix} \text{map}_{x\_raw} + x \\ \text{map}_{z\_raw} + z \end{pmatrix} \qquad \text{Expression 3}$$

The comparative position data group extractor 20 extracts a comparative position data group from a position data group regarding the shape of a feature that has the same feature type on the map as that of a surrounding feature detected by the feature detector 40 described below.

For example, in a case where the feature detected by the feature detector 40 described below is a lane line, the comparative position data group extractor 20 may extract the coordinate value of position information whose feature type is a lane line from the database illustrated in FIG. 2 and set the extracted coordinate value as a comparative position data group.

The comparative position data group storage 21 may temporarily store the comparative position data group extracted by the comparative position data group extractor 20.

Information regarding the comparative position data group stored in the comparative position data group storage 21 may be read out and used for an error calculation process by the error processor 60 described below.

The imaging unit 30 may be, for example, a stereo camera or a monocular camera. The imaging unit 30 may capture a moving image of the region ahead of a vehicle MC.

The moving image captured by the imaging unit 30 may be outputted to the feature detector 40 described below.

Figure 4:
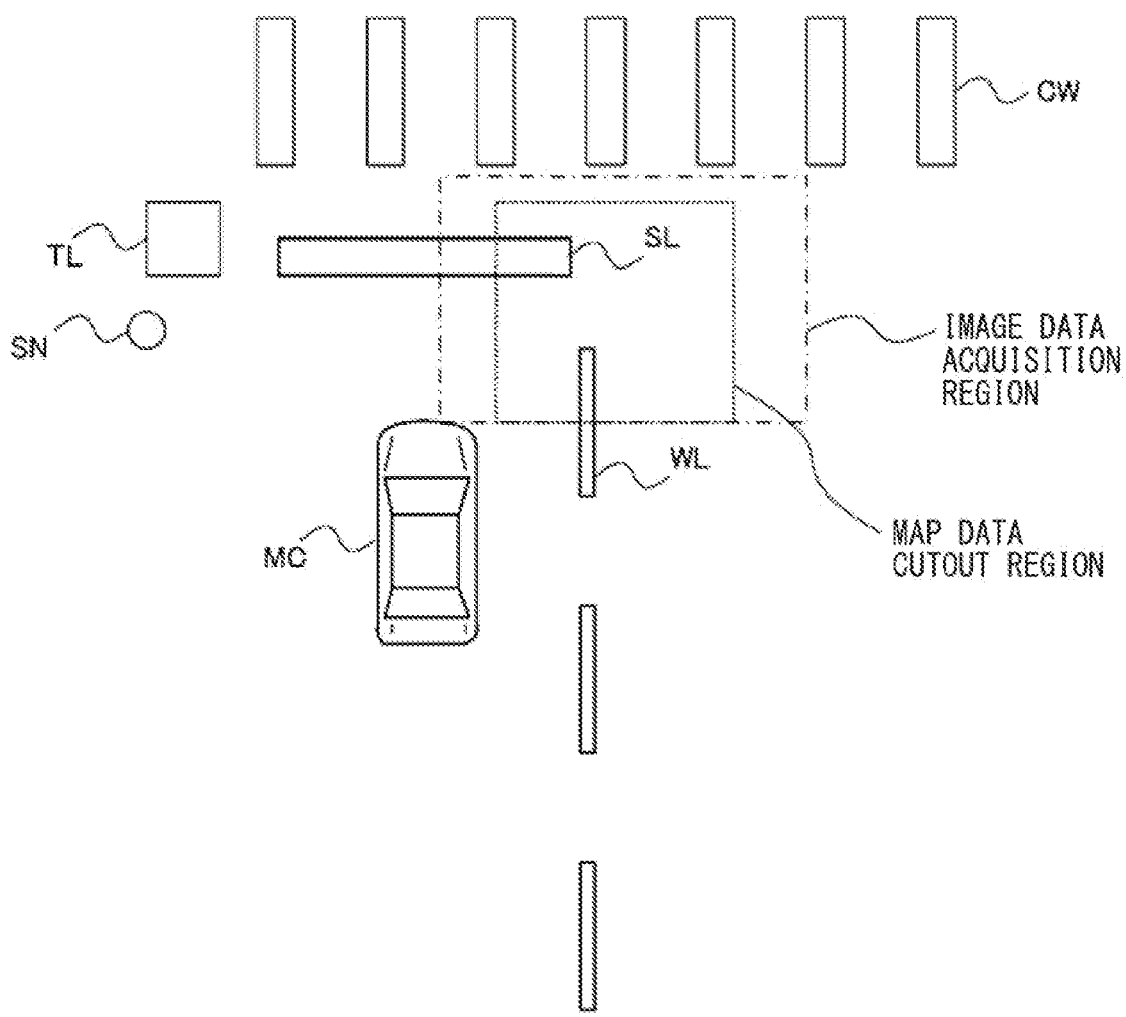
FIG. 4 is a diagram illustrating an example of a map data cutout region and an image data acquisition region for a vehicle according to one example embodiment of the disclosure and a surrounding feature.

For example, in the example illustrated in FIG. 4, the imaging unit 30 may capture an image in the image data acquisition region surrounded by the one-dot chain line, and the image data or the point group data of a portion of the lane line WL and a portion of the stop line SL may be acquired from the image data.

Here, the image data acquisition region may be larger than the map data cutout region in consideration of the traveling behavior of the vehicle MC.

The captured image storage 31 may temporarily store a moving image captured by the imaging unit 30.

For example, in the example illustrated in FIG. 4, the captured image storage 31 may temporarily store the moving image data of the image data acquisition region out of the moving image captured by the imaging unit 30.

The moving image stored in the captured image storage 31 may be read out by the reference position data group extractor 50.

The feature detector 40 may detect, from the image data captured by the imaging unit 30, a surrounding feature that is positioned within a predetermined range from the vehicle MC and frequently appears in any traveling environment.

Examples of an unfavorable traveling environment include an area such as an area in a tunnel or an urban area crowded with groups of buildings. Examples of a surrounding feature that frequently appears in even such an unfavorable traveling environment include the shape of a road including the lane line WL.

For example, in the example illustrated in FIG. 4, the feature detector 40 may detect the lane line WL and the crosswalk CW as surrounding features within the predetermined range from the vehicle MC.

In general, as the vehicle has a longer distance to the feature, the mismatch may be smaller between the image data and the map data. In one example, the predetermined range may be based on knowledge.

The feature detector 40 may detect a surrounding feature that is the closest to the vehicle within the predetermined range.

The detection information may be then outputted to the map data cutout unit 11 and the reference position data group extractor 50.

The reference position data group extractor 50 may read out the moving image stored in the captured image storage 31 out of the image data captured by the imaging unit 30. The reference position data group extractor 50 extracts, as a reference position data group, a position data group regarding the shape of a surrounding feature that has the same feature type as that of a feature detected by the feature detector 40.

The reference position data group storage 51 may temporarily store the reference position data group extracted by the reference position data group extractor 50.

Information regarding the reference position data group stored in the reference position data group storage 51 may be read out and used for the error calculation process by the error processor 60 described below.

The error processor 60 associates each of pieces of data in the reference position data group stored in the reference position data group storage 51 with a corresponding one of pieces of data in the comparative position data group stored in the comparative position data group storage 21. The corresponding one of the pieces of data in the comparative position data group has the shortest distance to the piece of data in the reference position data group. The error processor 60 may calculate an error in the distance between each of the pieces of the reference position data and the corresponding one of the pieces of the comparative position data that are associated with each other, and calculate a parameter that minimizes the sum total of the distances between the pieces of reference position data and the respective pieces of comparative position data that are associated with each other.

Figure 6:
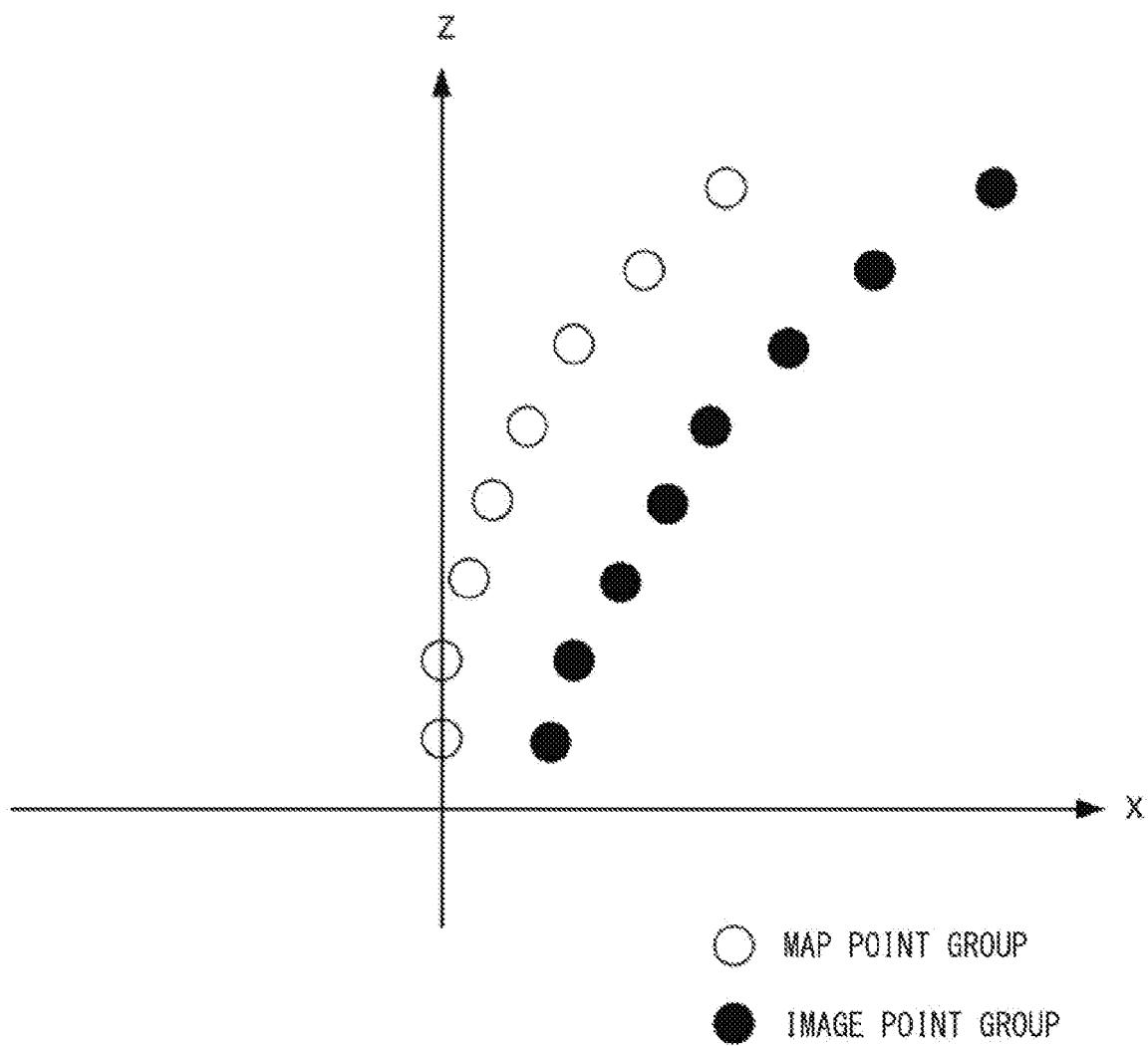
FIG. 6 is a diagram illustrating an example of data received by an error processor in the vehicle position information acquisition device according to one example embodiment of the disclosure.

For example, as illustrated in FIG. 6, the error processor 60 associates each of the pieces of data in the reference position data group with the corresponding one of the pieces of data in the comparative position data group stored in the comparative position data group storage 21. The corresponding one of the pieces of data in the comparative position data group has the shortest distance to the piece of data in the reference position data group. The error processor 60 may map the pieces of data in an XZ coordinate system.

In FIG. 6, hollow circles (○) represent a map point group and solid circles (•) represent an image point group.

Figure 7:
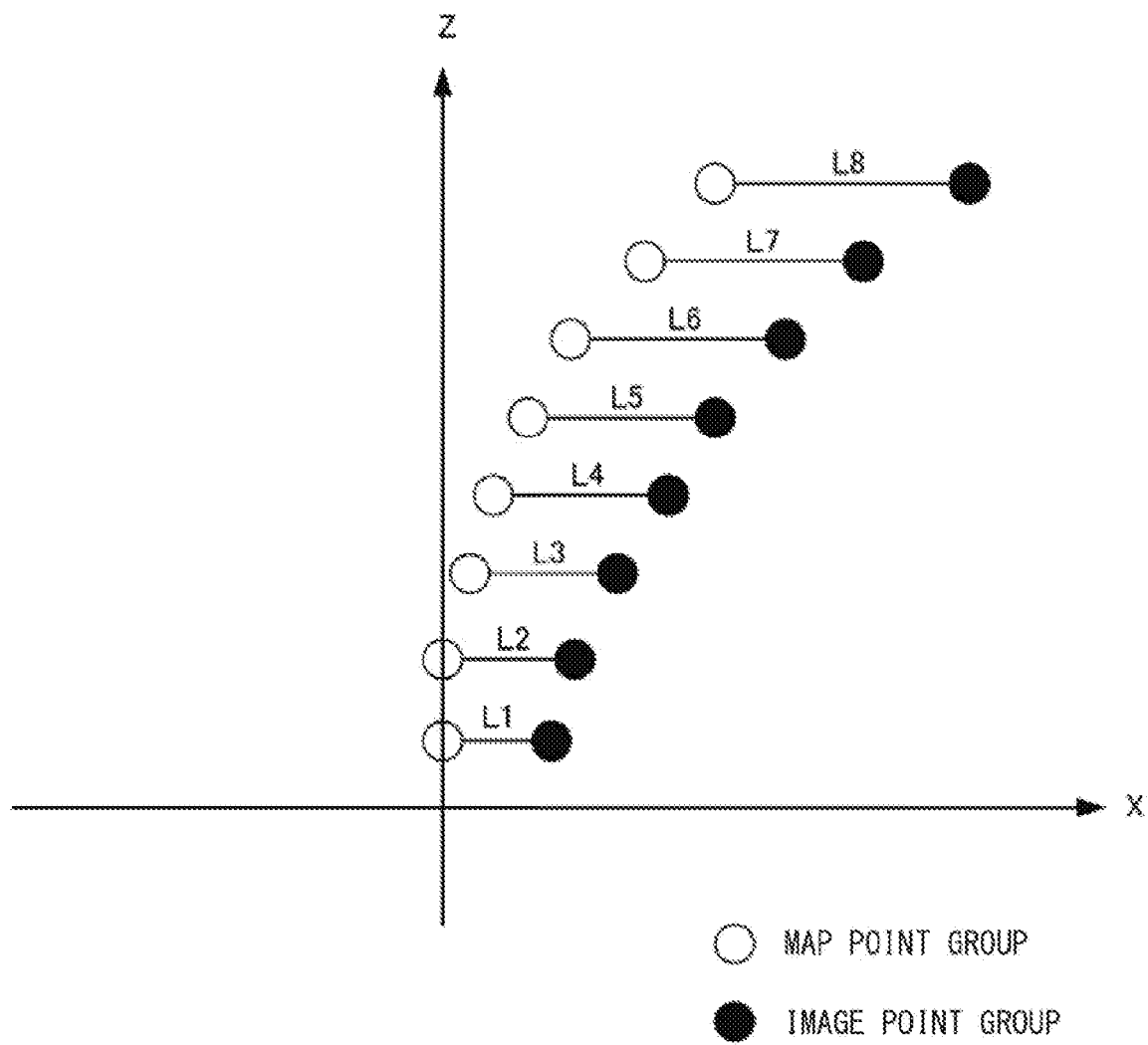
FIG. 7 is a diagram illustrating an example of association of pieces of data received by the error processor in the vehicle position information acquisition device according to one example embodiment of the disclosure.

As illustrated in FIG. 7, in Substep 1, the error processor 60 may define the sum total of the distances between the associated points in the map point groups and the associated corresponding points in the image point groups as a cost function represented by Expression 4. The distances are represented by L1 to L8 in FIG. 7.

$$\text{Cost}(x,z,\theta)=\Sigma\text{distance}(\text{Cam}\leftrightarrow\text{Map}) \quad \text{Expression 4}$$

Figure 8:
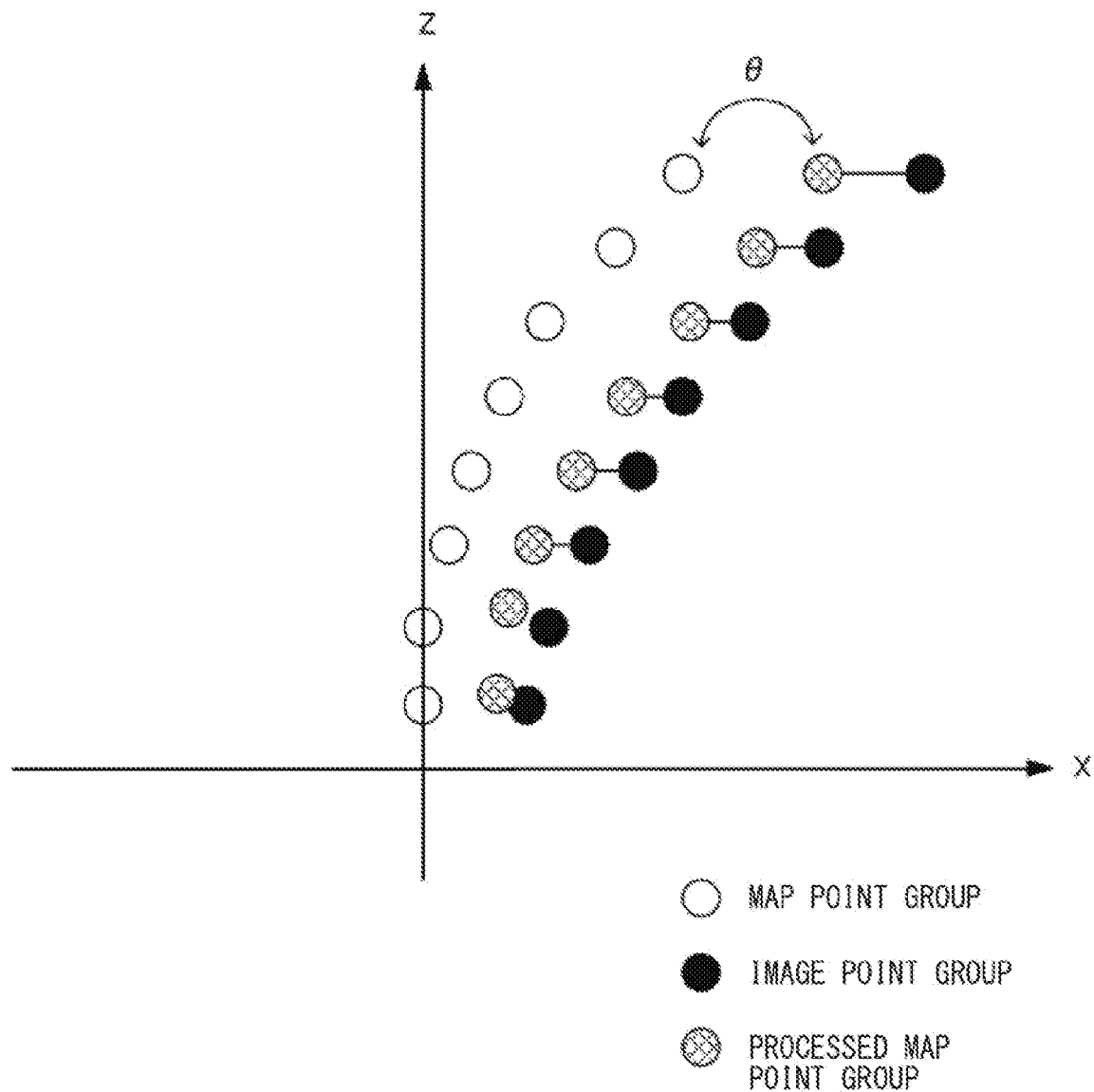
FIG. 8 is a diagram illustrating an example of a process of calculating a coordinate conversion parameter by the error processor of the vehicle position information acquisition device according to one example embodiment of the disclosure.

Next, as illustrated in FIG. 8, a parameter (x, z, θ) may be calculated that minimizes the cost function defined by Expression 4.

Hereinafter, an example is described in which a steepest-descent method is used as a method of calculating the parameter (x, z, θ).

In the next Substep 2, Cost(x, z, θ) may be partially differentiated for x, z, and θ by using Expressions 5, 6, and 7, respectively, to calculate the gradient of the current parameter (x, z, θ).

$$x_{n+1} = x_n + div_x * (-1) * \left(\frac{\alpha}{n}\right) \quad \text{Expression 5}$$

$$z_{n+1} = z_n + div_z * (-1) * \left(\frac{\alpha}{n}\right) \quad \text{Expression 6}$$

$$\theta_{n+1} = \theta_n + div_\theta * (-1) * \left(\frac{\alpha}{n}\right) \quad \text{Expression 7}$$

In Expressions 5 to 7, a represents a learning rate indicating how much the parameter is updated at each iteration.

Next, in Substep 3, the parameter (x, z, θ) may be updated in the direction opposite to the gradient calculated in Substep 2.

The processes from Substep 1 to Substep 3 may be iterated until the parameter (x, z, θ) converges. The parameter (x, z, θ) that has converged may be then outputted to the correction unit 70 described below.

The correction unit 70 may receive the parameter (x, z, θ) from the error processor 60 and receive ($map_{x\_raw}$, $map_{z\_raw}$) from the position information detector 80 described below. The correction unit 70 may substitute the parameter (x, z, θ) and ($map_{x\_raw}$, $map_{z\_raw}$) into Expression 3 to obtain corrected ($map_{x\_own}$, $map_{z\_own}$).

The position information detector 80 may detect the position information of the vehicle by using the GPS or other systems.

The position information of the vehicle detected by the position information detector 80 may be outputted to the correction unit 70.

[Process of Vehicle Position Information Acquisition Device 1]

Figure 5:
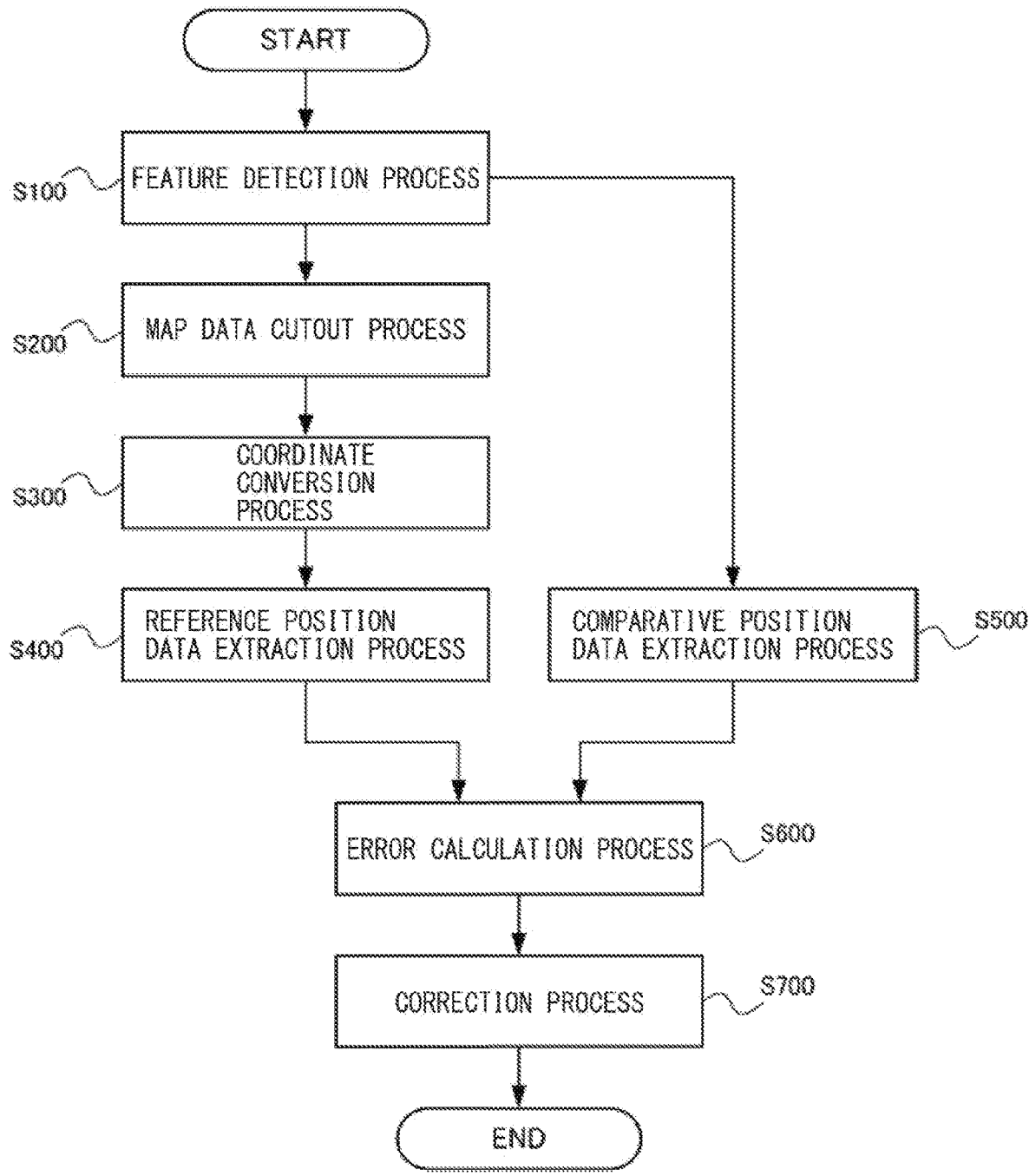
FIG. 5 is a diagram illustrating a processing flow of the vehicle position information acquisition device according to one example embodiment of the disclosure.

A process of the vehicle position information acquisition device 1 according to the example embodiment is described with reference to FIG. 5.

In Step S100, the feature detector 40 may detect, from the image data captured by the imaging unit 30, a surrounding feature that is positioned within a predetermined range from the vehicle MC and frequently appears in any traveling environment.

The detection information provided from the feature detector 40 may be outputted to the map data cutout unit 11.

The map data cutout unit 11 may receive the detection information from the feature detector 40 and cut out map information regarding a region around a specific feature from the map data stored in the map data storage 10 on the basis of the detection information received from the feature detector 40 in Step S200. The specific feature may be detected by the feature detector 40.

In Step S300, the coordinate converter 12 may convert the coordinates of a position data group expressed in the coordinate system of the map in the map information cut out by the map data cutout unit 11 into coordinates in a coordinate system in which the lateral direction of the vehicle as viewed from the front serves as the X axis and the longitudinal direction of the vehicle as viewed from the front serves as the Z axis.

For example, in a case where coordinate information that has not yet been converted is represented by Expression 8 and coordinate information that has been converted is represented by Expression 9, the coordinates may be converted in accordance with the conversion equation represented by Expression 10.

$$\begin{pmatrix} \text{map}_{x\_raw} \\ \text{map}_{z\_raw} \end{pmatrix} \qquad \text{Expression 8}$$

$$\begin{pmatrix} \text{map}_{x\_own} \\ \text{map}_{z\_own} \end{pmatrix} \qquad \text{Expression 9}$$

$$\begin{pmatrix} \text{map}_{x\_own} \\ \text{map}_{z\_own} \end{pmatrix} = \begin{pmatrix} \cos\theta & \sin\theta \\ -\sin\theta & \cos\theta \end{pmatrix} * \begin{pmatrix} \text{map}_{x\_raw} + x \\ \text{map}_{z\_raw} + z \end{pmatrix} \qquad \text{Expression 10}$$

In Step S400, the reference position data group extractor 50 may read out the moving image stored in the captured image storage 31 out of the image data captured by the imaging unit 30. The reference position data group extractor 50 extracts, as a reference position data group, a position data group regarding the shape of a surrounding feature that has the same feature type as that of a feature detected by the feature detector 40.

In Step S500, the comparative position data group extractor 20 extracts a comparative position data group from a position data group regarding the shape of a feature that has the same feature type on the map as that of a surrounding feature detected by the feature detector 40.

The error processor 60 associates each of pieces of data in the reference position data group stored in the reference position data group storage 51 with a corresponding one of pieces of data in the comparative position data group stored in the comparative position data group storage 21. The corresponding one of the pieces of data in the comparative position data group has the shortest distance to the piece of data in the reference position data group. The error processor 60 may calculate an error in the distance between each of the pieces of the reference position data and the corresponding one of the pieces of the comparative position data that are associated with each other, and calculate a parameter that minimizes the sum total of the distances between the pieces of reference position data and the pieces of comparative position data that are associated with each other.

For example, as illustrated in FIG. 6, the error processor 60 associates each of the pieces of data in the reference position data group with the corresponding one of the pieces of data in the comparative position data group stored in the comparative position data group storage 21. The corresponding one of the pieces of data in the comparative position data group has the shortest distance to the piece of data in the reference position data group. The error processor 60 may map the pieces of data in the XZ coordinate system.

In FIG. 6, hollow circles ○ represent a map point group and solid circles ● represent an image point group.

As illustrated in FIG. 7, in Substep 1, the error processor 60 may define the sum total of the distances between the associated points in the map point groups and the associated corresponding points in the image point groups as a cost function represented by Expression 11. The distances are represented by L1 to L8 in FIG. 7.

$$\text{Cost}(x,z,\theta) = \Sigma \text{distance}(\text{Cam} \leftrightarrow \text{Map}) \qquad \text{Expression 11}$$

Next, as illustrated in FIG. 8, the parameter (x, z, θ) may be calculated that minimizes the cost function defined by Expression 11.

Hereinafter, an example is described in which the steepest-descent method is used as a method of calculating the parameter (x, z, θ).

In the next Substep 2, Cost(x, z, θ) may be partially differentiated for x, z, and θ by using Expressions 12, 13, and 14, respectively, to calculate the gradient of the current parameter (x, z, θ).

$$x_{n+1} = x_n + div_x * (-1) * \left(\frac{\alpha}{n}\right) \qquad \text{Expression 12}$$

$$z_{n+1} = z_n + div_z * (-1) * \left(\frac{\alpha}{n}\right) \qquad \text{Expression 13}$$

$$\theta_{n+1} = \theta_n + div_\theta * (-1) * \left(\frac{\alpha}{n}\right) \qquad \text{Expression 14}$$

In Expressions 12 to 14, a represents a learning rate indicating how much the parameter is updated at each iteration.

Next, in Substep 3, the parameter (x, z, θ) may be updated in the direction opposite to the gradient calculated in Substep 2.

The processes from Substep 1 to Substep 3 may be iterated until the parameter (x, z, θ) converges. In Step S600, the parameter (x, z, θ) that has converged may be then outputted to the correction unit 70 described below.

The correction unit 70 may receive the parameter (x, z, θ) from the error processor 60 and receive ($\text{map}_{x\_raw}$, $\text{map}_{z\_raw}$) from the position information detector 80 described below. In Step S700, the correction unit 70 may substitute the parameter (x, z, θ) and ($\text{map}_{x\_raw}$, $\text{map}_{z\_raw}$) into Expression 3 to obtain corrected ($\text{map}_{x\_own}$, $\text{map}_{z\_own}$).

[Workings and Effects]

As described above, the feature detector 40 of the vehicle position information acquisition device 1 according to the example embodiment may detect, from the image data captured by the imaging unit 30, a surrounding feature that is positioned within a predetermined range from the vehicle MC and frequently appears in any traveling environment. The reference position data group extractor 50 may extract a reference position data group from the image data. The reference position data group is a position data group regarding the shape of a surrounding feature that has the same feature type as that of a feature detected by the feature detector 40.

The comparative position data group extractor 20 extracts a comparative position data group from a position data group regarding the shape of a feature that has the same feature type on the map as that of a surrounding feature detected by the feature detector 40. The error processor 60 may associate each of pieces of data in the reference position data group extracted by the reference position data group extractor 50 with a corresponding one of pieces of data having the shortest distance to the piece of data in the reference position data group in the comparative position data group extracted by the comparative position data group extractor. The error processor 60 calculates an error in the distance between each of the pieces of the reference position data and the corresponding one of the comparative position data that are associated with each other. The position information detector 80 detects position information of the vehicle MC. The correction unit 70 corrects the position information of the vehicle MC detected by the position information detector 80 on the basis of the error calculated by the error processor 60.

In other words, the vehicle position information acquisition device 1 according to the example embodiment may adopt a data format in which position data regarding positions on a high-precision map and position data acquired from image data are associated with a feature. The feature may serve as an index to match a position data group regarding positions on the high-precision map with an image data group. The error processor 60 may further narrow down the matched data groups to pieces of data having the shortest distance to calculate an error in the distance. The position information detector 80 detects position information of the vehicle MC. The correction unit 70 corrects the position information of the vehicle MC detected by the position information detector 80 on the basis of the error calculated by the error processor 60.

This makes it possible to acquire precise position information of the vehicle MC.

The vehicle position information acquisition device 1 according to the example embodiment may use a feature as an index to match a position data group regarding positions on a high-precision map with an image data group. The error processor 60 may further narrow down the matched data groups to pieces of data having the shortest distance to calculate an error. This allows for a high-speed correction process. It is thus possible to precisely and quickly acquire the position information of the vehicle MC that changes from moment to moment.

The feature detector 40 of the vehicle position information acquisition device 1 according to the example embodiment may detect a surrounding feature that is the closest to the vehicle MC within the predetermined range.

In detail, the feature detector 40 may detect a surrounding feature that is the closest to the vehicle MC within the predetermined range. The reference position data group extractor 50 may extract, from image data, as a reference position data group, a position data group regarding the shape of a surrounding feature that has the same feature type as that of a feature detected by the feature detector 40. The comparative position data group extractor 20 may extract a comparative position data group from the position data group regarding the shape of the feature having the same feature type on a map as that of the surrounding feature detected by the feature detector 40. The error processor 60 associates each of the pieces of data in the reference position data group extracted by the reference position data group extractor 50 with the corresponding one of the pieces of data in the comparative position data group extracted by the comparative position data group extractor 20. The corresponding one of the pieces of data in the comparative position data group has the shortest distance to the piece of data in the reference position data group. The error processor 60 calculates an error in the distance between each of the pieces of the reference position data and the corresponding one of the comparative position data that are associated with each other. The position information detector 80 detects position information of the vehicle MC. The correction unit 70 corrects the position information of the vehicle MC detected by the position information detector 80 on the basis of the error calculated by the error processor 60.

Thus, the feature detector 40 may further narrow down features serving as indexes. This makes it possible to acquire more precise position information of the vehicle MC more quickly.

In the vehicle position information acquisition device 1 according to the example embodiment, the feature types may include a lane line, a stop line, a traffic light, a crosswalk, and a sign.

In other words, the main feature type may be a lane line indicating the shape of a road, but the feature types may also include a stop line, a traffic light, a crosswalk, and a sign.

This makes it possible to precisely and quickly acquire position information of the vehicle MC in even a place having an unfavorable reception environment by chiefly detecting a lane line, for example, in an area in a tunnel having an unfavorable reception environment or detecting, for example, a stop line, a traffic light, a crosswalk, or a sign, for example, on a narrow lane including even no center line and a one-way street in an urban area crowded with high-rise buildings.

The error processor 60 of the vehicle position information acquisition device 1 according to the example embodiment may calculate a coordinate conversion parameter that minimizes the sum total of the distances between pieces of reference position data and pieces of comparative position data that are associated with each other, thereby calculating an error between the reference position data and the comparative position data. In other words, the error processor 60 may calculate a correction value.

This makes it possible to acquire precise position information of the vehicle MC.

MODIFICATION EXAMPLES

In the example embodiment, the vehicle position information acquisition device 1 has been used as an example. However, a vehicle position information acquisition system may be adopted that includes, for example, a vehicle position information detection device provided in the vehicle compartment of a vehicle and a vehicle position information correction device provided in a cloud server.

In the case of such a system, the vehicle position information correction device having a large processing load may be configured by a server. This makes it possible to expect a higher-speed process.

The processes of the coordinate converter 12, the comparative position data group extractor 20, the reference position data group extractor 50, the error processor 60, the correction unit 70, and other components may be recorded in a recording medium that is readable by a computer system. The coordinate converter 12, the comparative position data group extractor 20, the reference position data group extractor 50, the error processor 60, the correction unit 70, and the other components may be caused to read and execute the program recorded in this recording medium, thereby making it possible to achieve the vehicle position information acquisition device 1 according to the example embodiment of the disclosure. As used herein, the term "computer system" may include hardware such as an operating system (OS) and peripheral devices.

In a case where the world wide web (www) system is used, the term "computer system" may include a website providing environment or a display environment. The program may be transmitted from the computer system in which the program is stored in a storage device or other devices to another computer system through a transmission medium or by a transmission wave in the transmission medium. As used herein, the term "transmission medium" that transmits the program may refer to a medium serving to transmit information like a network or a communication network such as the Internet or a telecommunication line or a communication line such as a telephone line.

Alternatively, the program may be for achieving some of the processes described above.

Further, the program may be a so-called differential file or a differential program that allows the processes described above to be achieved by being combined with another program that has been recorded in the computer system in advance.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to quickly and precisely acquire the position information of the vehicle.

The comparative position data group extractor 20, the feature detector 40, the reference position data group extractor 50, the error processor 60, and the correction unit 70 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the comparative position data group extractor 20, the feature detector 40, the reference position data group extractor 50, the error processor 60, and the correction unit 70 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the comparative position data group extractor 20, the feature detector 40, the reference position data group extractor 50, the error processor 60, and the correction unit 70 illustrated in FIG. 1.

The invention claimed is:

1. A vehicle position information acquisition device comprising:
a position information detector configured to detect position information of a vehicle;
a map data storage configured to store a feature type of a feature on a map and a position data group regarding a shape of the feature in association with each other;
an imaging unit configured to capture an image of a region ahead of the vehicle;
a feature detector configured to detect, on a basis of data on the image captured by the imaging unit, a surrounding feature frequently appearing within a predetermined range from the vehicle;
a reference position data group extractor configured to extract, as a reference position data group, a position data group regarding a shape of the surrounding feature having a feature type that is same as the feature type of the feature detected on the basis of the data on the image;
a reference position data group storage configured to store the reference position data group extracted by the reference position data group extractor;
a comparative position data group extractor configured to extract a comparative position data group from the position data group regarding the shape of the feature having the feature type that is same as the feature type of the surrounding feature detected by the feature detector;
a comparative position data group storage configured to store the comparative position data group extracted by the comparative position data group extractor;
an error processor configured to
associate each of pieces of reference position data in the reference position data group stored in the reference position data group storage with a corresponding one of pieces of comparative position data in the comparative position data group stored in the comparative position data group storage, the corresponding one of the pieces of the comparative position data having a shortest distance to the piece of the reference position data, and
calculate an error in a distance between each of the pieces of the reference position data and the corresponding one of the pieces of the comparative position data that are associated with each other; and
a correction unit configured to correct, on a basis of the error in the distance calculated by the error processor, the position information of the vehicle detected by the position information detector.

2. The vehicle position information acquisition device according to claim 1, wherein the feature detector is configured to detect the surrounding feature that is closest to the vehicle within the predetermined range.

3. The vehicle position information acquisition device according to claim 2, wherein the feature type comprises one or more of a lane line, a stop line, a traffic light, a crosswalk, and a sign.

4. The vehicle position information acquisition device according to claim 2, wherein the error processor is configured to calculate a coordinate conversion parameter that minimizes a sum total of distances between the pieces of reference position data and the respective pieces of comparative position data that are associated with each other.

5. The vehicle position information acquisition device according to claim 1, wherein the error processor is configured to calculate a coordinate conversion parameter that minimizes a sum total of distances between the pieces of reference position data and the respective pieces of comparative position data that are associated with each other.

6. The vehicle position information acquisition device according to claim 1, wherein the feature type comprises one or more of a lane line, a stop line, a traffic light, a crosswalk, and a sign.

7. A vehicle position information acquisition system comprising:
- a vehicle position information detection device; and
- a vehicle position information correction device, wherein the vehicle position information detection device comprises
    - a position information detector configured to detect position information of a vehicle,
    - a map data storage configured to store a feature type of a feature on a map and a position data group regarding a shape of the feature in association with each other, and
    - a transmitter configured to transmit the feature type, the position data group regarding the shape of the feature, and the position information of the vehicle to the vehicle position information correction device, the feature type and the position data group being stored in the map data storage, and
- the vehicle position information correction device comprises
    - one or more processors, and
    - one or more memories communicably coupled to the one or more processors,
    - the one or more processors being each configured to
        - detect, on a basis of data on an image of a region ahead of the vehicle, a surrounding feature frequently appearing within a predetermined range from the vehicle,
        - store, in a first memory, as a reference position data group, the position data group regarding the shape of the feature having the feature type that is same as the feature type of the surrounding feature detected on the basis of the data on the image,
        - extract, from the map data storage, as a comparative position data group, the position data group regarding the shape of the feature having the feature type that is same as the feature type of the detected surrounding feature,
        - store the extracted comparative position data group in a second memory,
        - associate each of pieces of reference position data in the reference position data group with a corresponding one of pieces of comparative position data in the comparative position data group, the corresponding one of the pieces of the comparative position data having a shortest distance to the piece of the reference position data,
        - calculate an error in a distance between each of the pieces of the reference position data stored in the first memory and the corresponding one of the pieces of the comparative position data stored in the second memory that are associated with each other, and
        - correct the position information of the vehicle on a basis of the calculated error in the distance.

8. A vehicle position information acquisition method comprising:
- detecting, on a basis of data on an image of a region ahead of the vehicle, a surrounding feature frequently appearing within a predetermined range from the vehicle;
- extracting, from the data on the image, as a reference position data group, a position data group regarding a shape of the feature having a feature type that is same as the feature type of the detected feature and storing the extracted reference position data group in a first memory;
- extracting, from a map data storage, a comparative position data group regarding the shape of the feature having the feature type that is same as the feature type of the detected surrounding feature and storing the extracted comparative position data group in a second memory, the map data storage being configured to store the feature type of the feature on a map and the position data group regarding the shape of the feature in association with each other;
- associating each of pieces of reference position data in the reference position data group with a corresponding one of pieces of comparative position data in the comparative position data group and calculating an error in a distance between each of the pieces of the reference position data stored in the first memory and the corresponding one of the pieces of the comparative position data stored in the second memory, the corresponding one of the pieces of the comparative position data having a shortest distance to the reference position data; and
- correcting the position information of the vehicle on a basis of the calculated error in the distance.

9. A vehicle position information acquisition device comprising:
- a position information detector configured to detect position information of a vehicle;
- a map data storage configured to store a feature type of a feature on a map and a position data group regarding a shape of the feature in association with each other;
- an imaging unit configured to capture an image of a region ahead of the vehicle;
- a reference position data group storage;
- a comparative position data group storage; and
- circuitry configured to
    - detect, on a basis of data on the image captured by the imaging unit, a surrounding feature frequently appearing within a predetermined range from the vehicle,
    - extract, as a reference position data group, a position data group regarding a shape of the surrounding feature having a feature type that is same as the feature type of the feature detected on the basis of the data on the image, the reference position data group being to be stored in the reference position data group storage,
    - extract a comparative position data group from the position data group regarding the shape of the feature having the feature type that is same as the feature type of the surrounding feature detected by the feature detector, the comparative position data group being to be stored in the comparative position data group storage,
    - associate each of pieces of reference position data in the reference position data group stored in the reference position data group storage with a corresponding one of pieces of comparative position data in the comparative position data group stored in the comparative position data group storage, the corresponding one of the pieces of the comparative position data having a shortest distance to the piece of the reference position data,
calculate an error in a distance between each of the pieces of the reference position data and the corresponding one of the pieces of the comparative position data that are associated with each other, and
correct, on a basis of the calculated error in the distance, the position information of the vehicle detected by the position information detector.

* * * * *